(12) United States Patent
Isoshima et al.

(10) Patent No.: US 8,457,931 B2
(45) Date of Patent: Jun. 4, 2013

(54) NUMERICAL ANALYSIS DATA EVALUATION APPARATUS AND THERMAL FLUID PRESSURE DATA EVALUATION APPARATUS USING THE SAME

(75) Inventors: Nobuyuki Isoshima, Mito (JP); Makoto Onodera, Hitachinaka (JP); Masayuki Hariya, Kasumigaura (JP)

(73) Assignee: Hitachi, Ltd., Tokyo (JP)

( * ) Notice: Subject to any disclaimer, the term of this patent is extended or adjusted under 35 U.S.C. 154(b) by 294 days.

(21) Appl. No.: 12/911,991

(22) Filed: Oct. 26, 2010

(65) Prior Publication Data
US 2011/0098987 A1    Apr. 28, 2011

(30) Foreign Application Priority Data
Oct. 28, 2009    (JP) ................................ 2009-247871

(51) Int. Cl.
*G06G 7/56* (2006.01)
*G06F 17/50* (2006.01)

(52) U.S. Cl.
USPC .................................................. 703/1; 703/5

(58) Field of Classification Search
None
See application file for complete search history.

(56) References Cited

U.S. PATENT DOCUMENTS

| | | | | |
|---|---|---|---|---|
| 5,838,594 | A * | 11/1998 | Kojima | 703/2 |
| 7,376,540 | B2 * | 5/2008 | Onodera et al. | 703/1 |
| 2004/0044504 | A1 * | 3/2004 | Shimizu | 703/2 |
| 2004/0186604 | A1 * | 9/2004 | Onodera et al. | 700/97 |
| 2007/0097117 | A1 * | 5/2007 | Chien et al. | 345/420 |
| 2007/0124720 | A1 * | 5/2007 | Aoki et al. | 716/20 |
| 2008/0246766 | A1 * | 10/2008 | Yokohari et al. | 345/423 |
| 2009/0271156 | A1 * | 10/2009 | Kageura | 703/1 |

FOREIGN PATENT DOCUMENTS

| | | |
|---|---|---|
| EP | 1083499 A2 * | 3/2001 |
| JP | 2004110793 | 8/2004 |
| JP | 2004-287701 A | 10/2004 |
| JP | 2007004552 | 11/2007 |

OTHER PUBLICATIONS

Y. Ito et al., Improvements in the reliability and quality of unstructured hybrid mesh generation, International Journal for Numerical Methods in Fluids, 2004, vol. 45, pp. 79-108.

* cited by examiner

*Primary Examiner* — Kamini S Shah
*Assistant Examiner* — Jay B Hann
(74) *Attorney, Agent, or Firm* — Mattingly & Malur, PC

(57) ABSTRACT

A numerical analysis data evaluation apparatus includes: a shell generation model which converts a three-dimensional shape model into a three-dimensional shell model so that a thickness on an analysis model becomes zero; a front surface-side physical quantity projector and a rear surface-side physical quantity projector which interpolate physical quantities of front surface-side elements and physical quantities of rear surface-side elements of the three-dimensional shape model obtained as a result of the numerical analysis in on-shell model element data obtained by spatially discretizing the three-dimensional shell model, and project the physical quantities on front surface-side physical quantities and rear surface-side physical quantities of on-shell elements; an on-shell element front surface-side physical quantity data storage unit; an on-shell element rear surface-side physical quantity data storage unit; and an arithmetic unit which calculates differences between the front surface-side physical quantities and the rear surface-side physical quantities of the on-shell elements.

2 Claims, 13 Drawing Sheets

NUMERICAL ANALYSIS DATA EVALUATION APPARATUS AND THERMAL FLUID PRESSURE DATA EVALUATION APPARATUS USING THE SAME

BACKGROUND OF THE INVENTION

1. Field of the Invention

The present invention relates to a numerical analysis data evaluation apparatus suitably applied to a CAE (Computer Aided Engineering) system for numerically simulating a physical phenomenon based on numerical analysis using a three-dimensional shape model, and a thermal fluid pressure data evaluation apparatus using the numerical analysis data evaluation apparatus.

2. Description of the Background Art

In numerical analysis represented by a FEM (finite element method), a FDM (finite difference method) or a FVM (finite volume method), a technique of modeling an object or fluid region to be analyzed with a set of elements such as hexahedral mesh or tetrahedral mesh has been heretofore used in order to perform various kinds of analyses such as thermal fluid analysis, strength analysis, electromagnetic field analysis, acoustic analysis, etc. When the object to be analyzed is a thin plate structure, quadrilateral or triangular elements with thicknesses given as attribute values may be used. This is because the load on calculation of shell elements such as quadrilateral elements or triangular elements is lower than the load on calculation of solid elements such as hexahedral mesh or tetrahedral mesh. Because the needs of reproducing and evaluating a shape more in detail are high in practical design, a three-dimensional analysis model based on solids with thicknesses is often generated even for a shape model of a thin plate structure. In addition, the case for performing large-scale numerical analysis using a detailed three-dimensional shape model and large in the number of elements has increased in cooperation with recent improvement in computer throughput.

To evaluate various kinds of physical quantities obtained by numerical analysis, it is general that performance of each analysis model is evaluated while isosurfaces in a designated region or contour lines in a designated cross section are dialogically displayed after execution of the analysis. On this occasion, not only physical quantities are displayed simply but also the spatial average value in the designated region and the integrated value, differential value, maximum value and minimum value of each physical quantity are generally obtained. For example, the highest point of temperature and the magnitude of pressure loss are evaluated in the case of thermal fluid analysis or the place of the maximum stress is specified and evaluated in the case of strength analysis through the aforementioned process, so that such evaluation is reflected on design of various kinds of devices.

In data evaluation of numerical analysis, the difference between the physical quantity on a front surface of each member constituting an object and the physical quantity on a rear surface of the member may be obtained to evaluate the distribution of physical quantity difference values between the front and rear surfaces of the member. With respect to spatially discretized elements of a three-dimensional shape model, however, the planar position of each element on the front surface of the member is not basically coincident with the planar position of a corresponding element on the rear surface of the member. It is therefore necessary to evaluate a desired region by traversing the point of evaluation while interpolating the value of the physical quantity of at least one element on a surface. For example, it is further necessary to beforehand predetermine a rear surface-side element or element group corresponding to a certain front surface-side element. In the background art, there is an instance in which correspondence between elements with respect to a flattened member is examined in advance based on coordinate information so that a program is generated specially by use of an extended function of an analysis result processing portion of a numerical analysis apparatus to execute a procedure of processing including interpolation of physical quantities. In this method, a result of analysis can be evaluated when another analysis is executed with only change of analysis conditions (load condition etc. in the case of strength analysis, or heat value etc. in the case of thermal fluid analysis) without any change of the shape of the three-dimensional shape model.

However, when the size or structure of the three-dimensional shape model is changed largely, it is necessary to generate the program again. Although processing can be made relatively easily if the member to be evaluated is a simple flat plate, there has been heretofore no generalized method for evaluating physical quantity differences between a front surface side and a rear surface side of a three-dimensional shape model having a complicated geometry because there is an additional portion to a general structure, for example, a general structure-reinforcement rib is attached to the general structure, an assembling hole is formed in the general structure, and a concave/convex portion is partially present in the general structure.

As countermeasures, there has been proposed a technique in which a result of expression of a physical quantity distribution of a front surface side of a member in contour line etc. and a result of expression of a physical quantity distribution of a rear surface side of the member in contour line etc. are displayed side by side for the purpose of visual evaluation or physical quantities of important places on the front surface side and the rear surface side are acquired at sampling points in a range of from the order of several points to the order of tens of points to quantitatively evaluate difference values therebetween in addition to the aforementioned visual evaluation (see Yasushi Ito and Kazuhiro Nakahashi, Improvements in the reliability and quality of unstructured hybrid mesh generation, International Journal for Numerical Methods in Fluids, 2004, vol. 45, pp 79-108).

The method disclosed in the International Journal for Numerical Methods in Fluids, 2004, vol. 45, pp 79-108 has a disadvantage in that the risk of slipping over important evaluation points becomes so high that the influence of evaluating persons' individual differences on evaluation of analysis results becomes large because sampling points are determined based on evaluating persons' past experience and intuition.

Moreover, with respect to the case where a three-dimensional shell model having a thickness of zero on analysis model is used in numerical analysis, the same problem as described above still remains because an analysis result evaluation portion of the numerical analysis apparatus according to the background art has no function of calculating physical quantity differences between the front surface side and the rear surface side of elements.

Moreover, when structural examination is made for the purpose of mounting of cooling in a device, there are many instances in which a secondary flow is caused by pressure difference when pressure difference between the front surface side and the rear surface side of a partition wall member is evaluated so that an opening is provided in a place where the pressure difference between the front and the rear of the member is large. Because the secondary flow passes by a heat generating body (heat generating parts) which is a subject of cooling, cooling may be accelerated easily without addition of any cooling fan. In this case, it is necessary to perform thermal fluid analysis of the three-dimensional shape model to specify a large pressure difference place of each member and evaluate whether the secondary flow effectively contributes to cooling of the noticeable heat generating body (heat generating parts) or not, when a structure in which an opening is provided in the large pressure difference place is formed.

In the background art, there is a problem that the time required for evaluation and examination becomes considerably long because each evaluating person decides the position and size of the opening in a trial-and-error manner depending on past experience and intuition. There is another problem that the degree of final improvement in cooling performance is apt to be affected by evaluating persons' individual differences so that structural cooling performance artificially varies easily according to evaluating persons' individual differences because the aspect of depending on evaluating persons' experience is high. Incidentally, this problem can be regarded as a problem in a thermal fluid pressure data evaluation apparatus when pressure is used as the physical quantity in the numerical analysis data evaluation apparatus.

SUMMARY OF THE INVENTION

The invention is accomplished to solve the aforementioned problems. A technical object of the invention is to provide a numerical analysis data evaluation apparatus which can easily evaluate physical quantity difference values between a front surface side and a rear surface side even when a three-dimensional analysis model having a complicated geometry is a subject of the apparatus, so that the risk of evaluating persons' slipping over evaluation of analysis results can be reduced and evaluation can be made rapidly when the shape of the model is changed.

Another technical object of the invention is to provide a thermal fluid pressure data evaluation apparatus using the numerical analysis data evaluation apparatus so that the thermal fluid pressure data evaluation apparatus can determine a structure-discussed place and a changed size accurately based on quantitative evaluation with respect to mounting of cooling requiring improvement in device structure, so that variations due to evaluation persons' individual differences can be suppressed.

According to one basic configuration of the numerical analysis data evaluation apparatus according to the invention for solving the aforementioned technical problem, there is provided a numerical analysis data evaluation apparatus including: an analyzer which performs numerical analysis of an analysis model intended for numerical simulation of a physical phenomenon by using a three-dimensional shell model with a thickness of zero on the analysis model; a first storage unit which stores data of on-shell model elements obtained by spatially discretizing the three-dimensional shell model and front surface-side physical quantities of on-shell elements; a second storage unit which stores rear surface-side physical quantities of the on-shell elements; and an arithmetic unit which calculates differences between the front surface-side physical quantities and the rear surface-side physical quantities of the on-shell elements.

According to another basic configuration of the numerical analysis data evaluation apparatus according to the invention for solving the aforementioned technical problem, there is provided a numerical analysis data evaluation apparatus including: an element generation device which generates element data on a three-dimensional shell model by spatially discretizing a thickness-including three-dimensional shape model generated by a three-dimensional shape modeler; an analyzer for performing numerical analysis of an analysis model being a subject of numerical simulation of a physical phenomenon by using the element data; a shell generation model which converts the three-dimensional shape model into the three-dimensional shell model so that a thickness on the analysis model becomes zero; a front surface-side physical quantity projector which interpolates physical quantities of front surface-side elements of the three-dimensional shape model obtained as a result of the numerical analysis in element data on a shell model obtained by spatially discretizing the three-dimensional shell model and projects the physical quantities on front surface-side physical quantities of on-shell elements; a rear surface-side physical quantity projector which interpolates physical quantities of rear surface-side elements of the three-dimensional shape model obtained as a result of the numerical analysis in element data on a shell model obtained by spatially discretizing the three-dimensional shell model and projects the physical quantities on rear surface-side physical quantities of on-shell elements; a third storage unit which stores the front surface-side physical quantities of the on-shell elements after the interpolation and projection; a fourth storage unit which stores the rear surface-side physical quantities of the on-shell elements after the interpolation and projection; and an arithmetic unit which calculates differences between the front surface-side physical quantities and the rear surface-side physical quantities of the on-shell elements after the interpolation and projection.

In any one of the basic configurations of the numerical analysis data evaluation apparatus, preferably, the numerical analysis data evaluation apparatus further includes: a reference value input unit which inputs a reference value for recognizing a feature region from analysis data as an output of the analyzer; and a region identification device which identifies a region in which the difference between the front surface-side physical quantity and the rear surface-side physical quantity of the analysis model obtained by a result of the numerical analysis is larger than the reference value, by utilizing the element data generated on the shell model based on the three-dimensional shape model.

Preferably, the numerical analysis data evaluation apparatus further includes an arithmetic operation display unit which performs an arithmetic operation for placing regions not smaller than the reference value in order of absolute value of the difference between the front surface-side physical quantity and the rear surface-side physical quantity in the analysis model or area integral value of the difference between the front surface-side physical quantity and the rear surface-side physical quantity, and displays the regions in the order.

In a thermal fluid pressure data evaluation apparatus using pressure as the physical quantity in the numerical analysis data evaluation apparatus according to the invention for solving another technical problem, the arithmetic unit calculates pressure difference between front surface-side pressure and rear surface-side pressure in the analysis model; the region identification device identifies regions in which the pressure difference or the area integral value of the pressure difference is not smaller than the reference value inputted by the reference value input unit; the arithmetic unit further calculates the distance between each region not smaller than the reference value and a heat generating body; and the arithmetic operation display unit performs an arithmetic operation for placing regions in ascending order of the distance and displays the regions in the order.

Preferably, in the thermal fluid pressure data evaluation apparatus, the arithmetic unit calculates the position and shape of a stream tube formed through an opening when the opening is provided in each of the regions identified by the region identification device, and the arithmetic unit further calculates a volume ratio of a heat generating body to the stream tube or a distance between the heat generating body and the stream tube; and the arithmetic operation display unit performs an arithmetic operation for placing position regions of the opening in descending order of the volume ratio or in ascending order of the distance, and displays the regions in the order.

According to the numerical analysis data evaluation apparatus according to the invention, even when a three-dimensional analysis model having a complicated geometry is a subject of the apparatus, physical quantity difference values between a front surface side and a rear surface side in the analysis model can be evaluated easily, so that the risk of evaluating persons' slipping over evaluation of analysis results can be reduced while evaluation can be made rapidly and accurately even when the shape of the three-dimensional analysis model is changed. The thermal fluid pressure data evaluation apparatus using pressure as the physical quantity in the numerical analysis data evaluation apparatus according to the invention can determine a structure-discussed place and a changed size accurately based on quantitative evaluation with respect to mounting of cooling requiring improvement in device structure, so that variations due to evaluating persons' individual differences can be suppressed sufficiently.

DETAILED DESCRIPTION OF THE INVENTION

A numerical analysis data evaluation apparatus and a thermal fluid pressure data evaluation apparatus using the same according to the invention will be described below in detail with reference to the drawings in connection with multiple embodiments.

Embodiment 1

Figure 1:
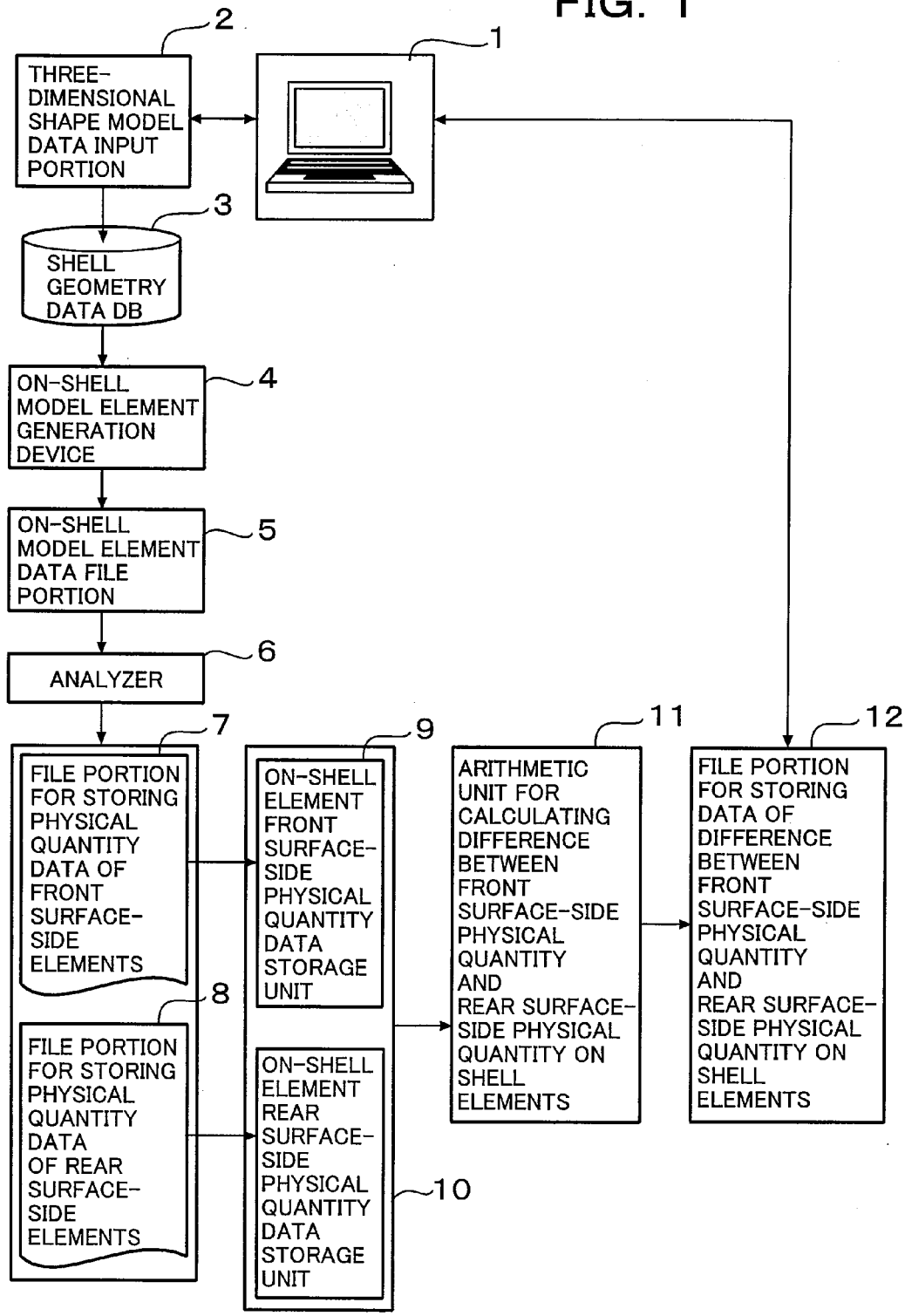
FIG. 1 is a block diagram showing the basic configuration of a numerical analysis data evaluation apparatus according to Embodiment 1 of the invention.

FIG. 1 is a block diagram showing the basic configuration of a numerical analysis data evaluation apparatus according to Embodiment 1 of the invention.

The numerical analysis data evaluation apparatus includes an input-output device 1, and a computer. The input-output device 1 includes an operation portion such as a keyboard, a mouse, etc., and a display unit having a display screen (display). The computer includes a plurality of storage units, and an arithmetic function portion.

The computer has: a three-dimensional shape model data input portion 2 which can input a three-dimensional shell model shape; a shell geometry data DB (database) 3; an on-shell model element generation device 4; an on-shell model element data file portion 5; an analyzer 6; a file portion 7 for storing physical quantity data of front surface-side ones of on-shell elements; a file portion 8 for storing physical quantity data of rear surface-side ones of the on-shell elements; an on-shell element front surface-side physical quantity data storage unit 9; an on-shell element rear surface-side physical quantity data storage unit 10; an arithmetic unit 11 for calculating difference between front surface-side physical quantity and rear surface-side physical quantity on shell elements; and a file portion 12 for storing data of the difference between the front surface-side physical quantity and the rear surface-side physical quantity on the shell elements.

To describe detailed functions of respective portions, the input-output device 1 which is used when a system user inputs or displays data includes a keyboard, a pointing device, a display, etc. The three-dimensional shape model data input portion 2 receives shape data including a three-dimensional shell with a thickness of zero in terms of analysis model intended as a subject of numerical simulation of a physical phenomenon, and stores data such as shell geometry data in the shell geometry data DB 3.

The on-shell model element generation device 4 spatially discretizes the shell geometry data stored in the shell geometry data DB 3 to divide the shell geometry data into elements such as triangular elements or quadrilateral elements, and registers data such as coordinates of nodes of the elements, thicknesses of the elements in terms of analysis, physical property values of the elements, etc., as on-shell element data, in the on-shell model element data file portion 5.

The analyzer 6 has a function of executing numerical analysis on an analysis model by using a three-dimensional shell model with a thickness of zero in terms of analysis model. Here, the analyzer 6 executes various kinds of numerical analyses based on element data on the shell model registered in the on-shell element data file portion 5 and a separately inputted analysis condition. The term "numerical analyses" described herein means strength analysis based on a finite element method, thermal fluid analysis based on a finite difference method, a finite volume method, or the like, electromagnetic field analysis based on an FDTD (Finite-Difference Time-Domain) method, analysis performed by spatially discretizing a designated region and solving a governing equation describing a physical phenomenon by using a numerically approximate algebraic equation, etc.

A lot of data are obtained from a result of analysis performed by the analyzer 6. Physical quantity data of front surface-side ones of the on-shell elements registered in the file portion 7 for storing the physical quantity data of the front surface-side ones of the on-shell elements are stored in the on-shell element front surface-side physical quantity data storage unit 9 while physical quantity data of rear surface-side ones of the on-shell elements registered in the file portion 8 for storing the physical quantity data of the rear surface-side ones of the on-shell elements are stored in the on-shell element rear surface-side physical quantity data storage unit 10. Incidentally, any one of the two surfaces concerned with the shell geometry data stored in the shell geometry data DB 3 can be designated as the front surface (i.e., the other surface can be designated as the rear surface).

The arithmetic unit 11 for calculating the difference between the front surface-side physical quantity and the rear surface-side physical quantity on the shell elements calculates data of the difference between the on-shell element front surface-side physical quantity data stored in the on-shell element front surface-side physical quantity data storage unit 9 and the on-shell element rear surface-side physical quantity data stored in the on-shell element rear surface-side physical quantity data storage unit 10, and registers the data in the file portion 12 for storing data of the difference between the front surface-side physical quantity and the rear surface-side physical quantity on the shell elements.

The input-output device 1 performs a designation operation on the operation portion for displaying data of the difference between the on-shell element front surface-side physical quantity and the on-shell element rear surface-side physical quantity registered in the file portion 12 for storing data of the difference between the on-shell element front surface-side physical quantity and the on-shell element rear surface-side physical quantity or registering and keeping these data.

In the numerical analysis data evaluation apparatus according to Embodiment 1, the on-shell model element data file portion 5 and the on-shell element front surface-side physical quantity data storage unit 9 serve as a first storage unit for storing on-shell model element data obtained by spatially discretizing a three-dimensional shell model and the on-shell element front surface-side physical quantity, whereas the on-shell element rear surface-side physical quantity data storage unit 10 serves as a second storage unit for storing the on-shell element rear surface-side physical quantity.

Figure 2:
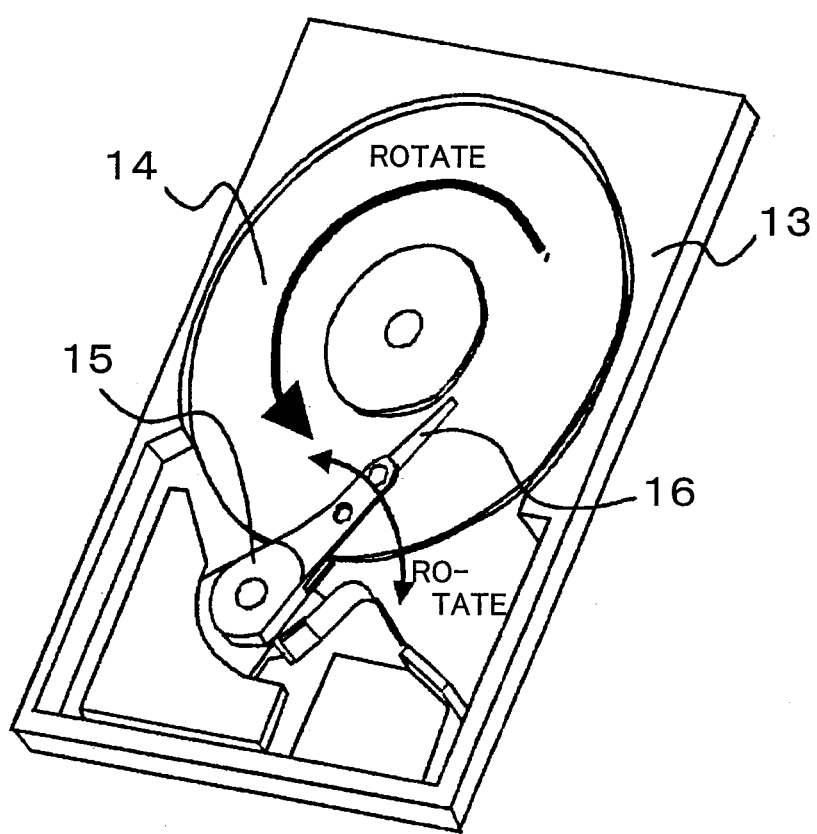
FIG. 2 is an exterior perspective view illustrating a three-dimensional shape model structure of a hard disk drive intended as a subject of a three-dimensional analysis model of the numerical analysis data evaluation apparatus shown in FIG. 1.

FIG. 2 is an exterior perspective view illustrating a three-dimensional shape model structure of a hard disk drive intended as a subject of a three-dimensional analysis model of the numerical analysis data evaluation apparatus.

In this hard disk drive, when an arm 15 moves in a radial direction of a disk 14 in a housing 13 in accordance with counterclockwise rotation of the disk 14 so that a head mounted in an arm tip portion 16 moves from an inner circumferential side to an outer circumferential side of the disk 14, data can be written in and recorded on the disk 14 or data recorded on the disk 14 can be read out and reproduced.

Figure 3:
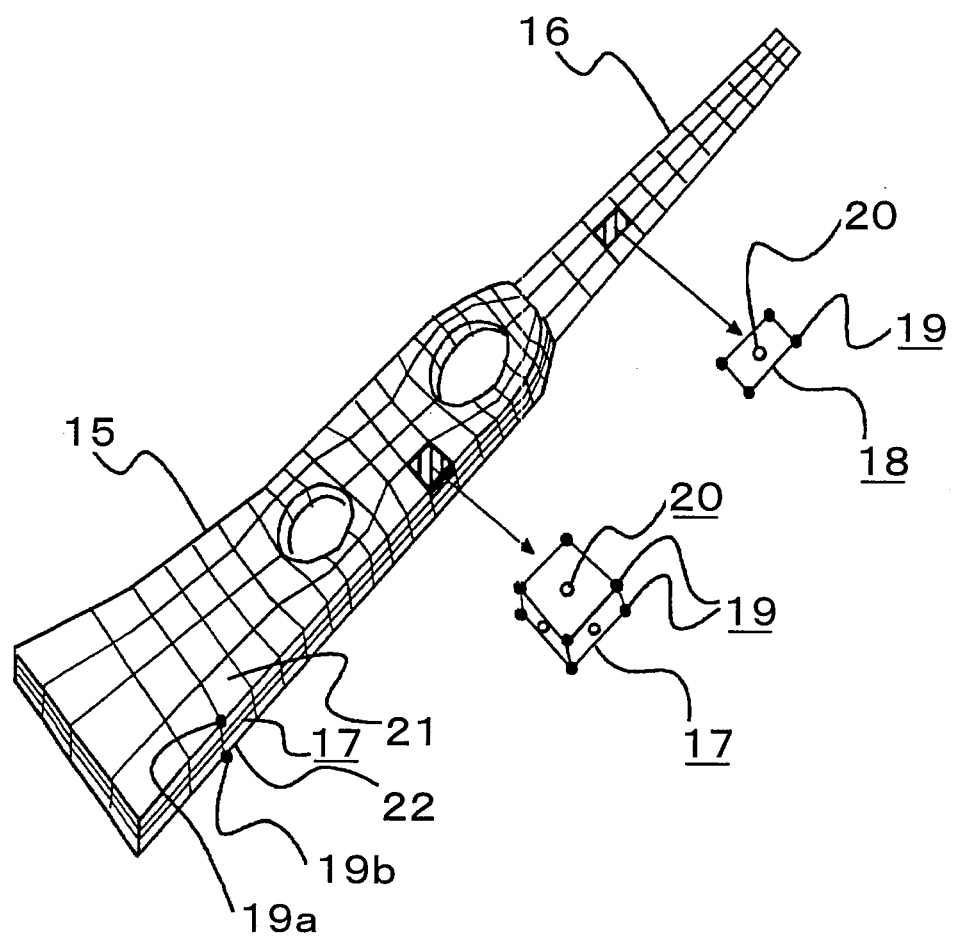
FIG. 3 is an enlarged view showing an analysis model of an arm and an arm tip portion which are important parts of the hard disk drive shown in FIG. 2 and which are displayed on a display screen of a display unit included in an input-output device provided in the numerical analysis data evaluation apparatus shown in FIG. 1.

FIG. 3 is an enlarged view showing an analysis model of the arm 15 and the arm tip portion 16 which are important parts of the hard disk drive and which are displayed on a display screen of the display unit included in the input-output device 1.

Because the arm tip portion 16 is a very thin structure compared with other portions, the number of elements generated by spatially discretizing an analysis region can be reduced greatly if the arm tip portion 16 is shape-processed as a shell model having a thickness given as an attribute during inputting of data into the analyzer 6 on the assumption that the thickness on the analysis model is zero when numerical analysis such as strength analysis or thermal fluid analysis is performed. That is, the arm 15 and the arm tip portion 16 in FIG. 3 may be inputted as a three-dimensional shape model having a thickness and shell geometry data, respectively, through the three-dimensional shape model data input portion 2. Incidentally, the arm tip portion 16 may be inputted as a three-dimensional shape model having a thickness, and the arm tip portion 16 may be converted into shell geometry data in the inside of the system. In this case, work can be simplified because a CAD (Computer Aided Design) model used in design and development of a product can be inputted directly.

In any case, the three-dimensional shape model data inputted thus are stored as shell geometry data in the shell geometry data DB 3 and then spatially discretized by the on-shell model element generation device 4 so as to be divided into a large number of elements. For example, in the case of FIG. 3, the arm 15 is discretized as a set of three-dimensional elements 17 of hexahedral mesh, and the arm tip portion 16 is discretized as a set of shell elements (two-dimensional) 18 of tetragons. With respect to the shape of each element, the arm 15 may be dealt with as other polyhedral elements such as tetrahedral elements and the arm tip portion 16 may be dealt with as other polygonal elements such as triangular elements. Incidentally, each of the three-dimensional elements 17 and the two-dimensional elements 18 has element surface center points 20 on surfaces partitioned by nodes 19.

Numerical analysis is executed by the analyzer 6 with the three-dimensional elements 17, the two-dimensional elements 18 and other input conditions (physical property values, boundary conditions, initial conditions, etc.) as input values. Examples of numerical analysis include various kinds of analyses such as strength analysis, thermal fluid analysis, electromagnetic field analysis, vibration analysis, etc. Each of these numerical analyses is executed based on an algebraic equation obtained by numerically discretizing a governing equation of a physical phenomenon.

With respect to the three-dimensional elements 17 mentioned herein, a physical quantity used in numerical analysis is defined on nodes 19 or based on representative points such as element surface center points 20 or element center points not shown. With respect to the two-dimensional elements 18, a physical quantity used in numerical analysis is similarly defined on nodes 19 or based on representative points such as element surface center points 20. In any case, the physical quantity can be recalculated by interpolation using values in elements or in adjacent elements. Accordingly, description will be made below while the case where the physical quantity is defined on nodes 19 is taken as an example.

The arm 15 shown in FIG. 3 is discretized as so-called layer-structured grids. Because there is no position displacement except the thickness direction, for example, the difference in physical quantity between the front and rear of the arm 15 in the position of three-dimensional elements 17 can be calculated based on the difference between a node 19a of one three-dimensional element 17 on a three-dimensional element front surface 21 and a node 19b of another three-dimensional element 17 on a three-dimensional element rear surface 22 when the numbers for identifying the three-dimensional elements 17 and the positions of the nodes in the elements are designated appropriately. In this embodiment, the three-dimensional element front surface 21 and the three-dimensional element rear surface 22 are defined as a near surface and a far surface, respectively, when the model is viewed from a view point. Although the front surface and the rear surface may be reversed when the view point is changed, the front surface and the rear surface are determined based on the distance from a model viewing point for the sake of convenience because there is no substantial problem.

On the contrary, the arm tip portion 16 is composed of two-dimensional elements (shell elements) 18. From the view of the number of nodes 19, front surface-side element physical quantity data and rear surface-side element physical quantity data are not directly held but physical quantity data as front and rear representative points are held. Accordingly, the difference between front surface-side element physical quantity data and rear surface-side element physical quantity data cannot be calculated directly.

Figure 4:
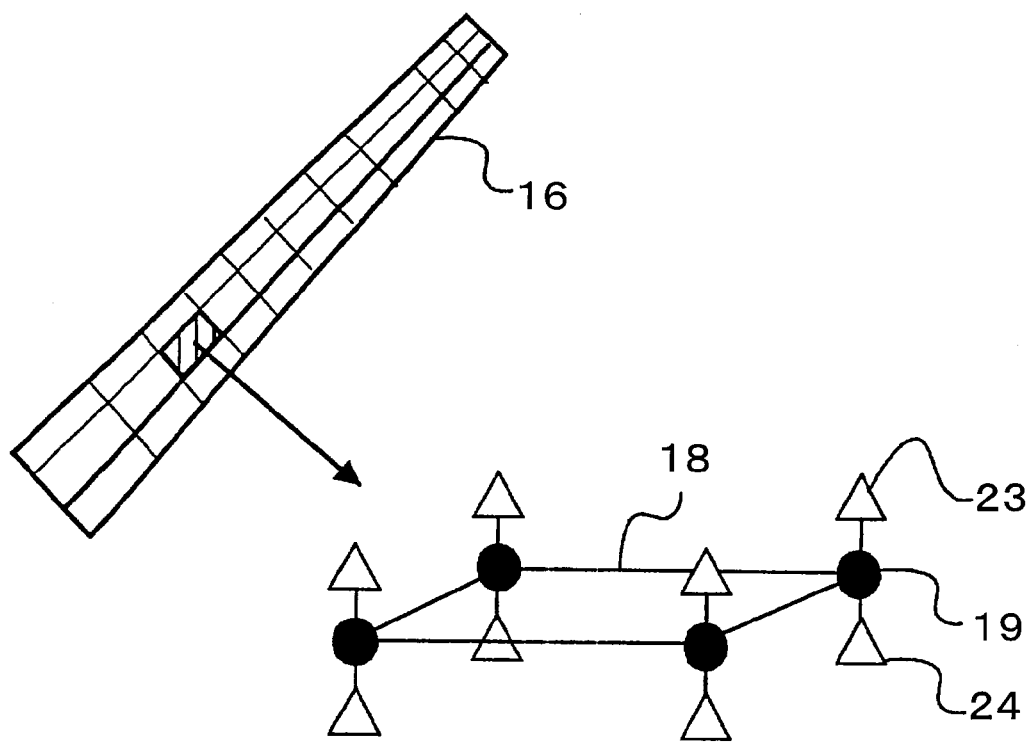
FIG. 4 is a schematic view for explaining added nodes of front surface-side physical quantity data and added nodes of rear surface-side physical quantity data which are in two-dimensional elements (shell elements) with respect to the arm tip portion shown in FIG. 3 and which are stored in storage units provided in the numerical analysis data evaluation apparatus shown in FIG. 1.

FIG. 4 is a schematic view for explaining added nodes 23 of front surface-side physical quantity data and added nodes 24 of rear surface-side physical quantity data in the two-dimensional elements (shell elements) 18 with respect to the arm tip portion 16.

Referring to the schematic view shown in FIG. 4, when added nodes 23 of front surface-side physical quantity data and added nodes 24 of rear surface-side physical quantity data in the two-dimensional elements (shell elements) 18 are provided so that the added nodes 23 and 24 are stored in the file portion 7 for storing physical quantity data of front surface-side elements and the file portion 8 for storing physical quantity data of rear surface-side elements at the time of analysis in the analyzer 6 or in an additional process after execution of analysis, data of the physical quantity difference between the front surface and the rear surface can be acquired easily in a wide range on shell geometry data by the arithmetic unit 11 which calculates the difference between front surface-side physical quantity and rear surface-side physical quantity on shell elements. After the data are registered in the file portion 12 for storing data of the difference between front surface-side physical quantity and rear surface-side physical quantity on shell elements, the data can be put in display or recording management by the input-output device 1.

According to the numerical analysis data evaluation apparatus according to Embodiment 1, the distribution of physical quantity difference values on shell elements can be acquired easily when numerical analysis is performed by use of shell geometry data stored in the shell geometry data DB 3. Accordingly, places where the difference between the front and the rear becomes large can be specified particularly easily. As a result, the risk of slipping over evaluation of analysis results causing a problem on design of various kinds of products can be reduced. Moreover, because the shape of shell geometry data can be given arbitrarily, it is possible to obtain an advantage that adaptability is improved even when the shape is changed.

Embodiment 2

Figure 5:
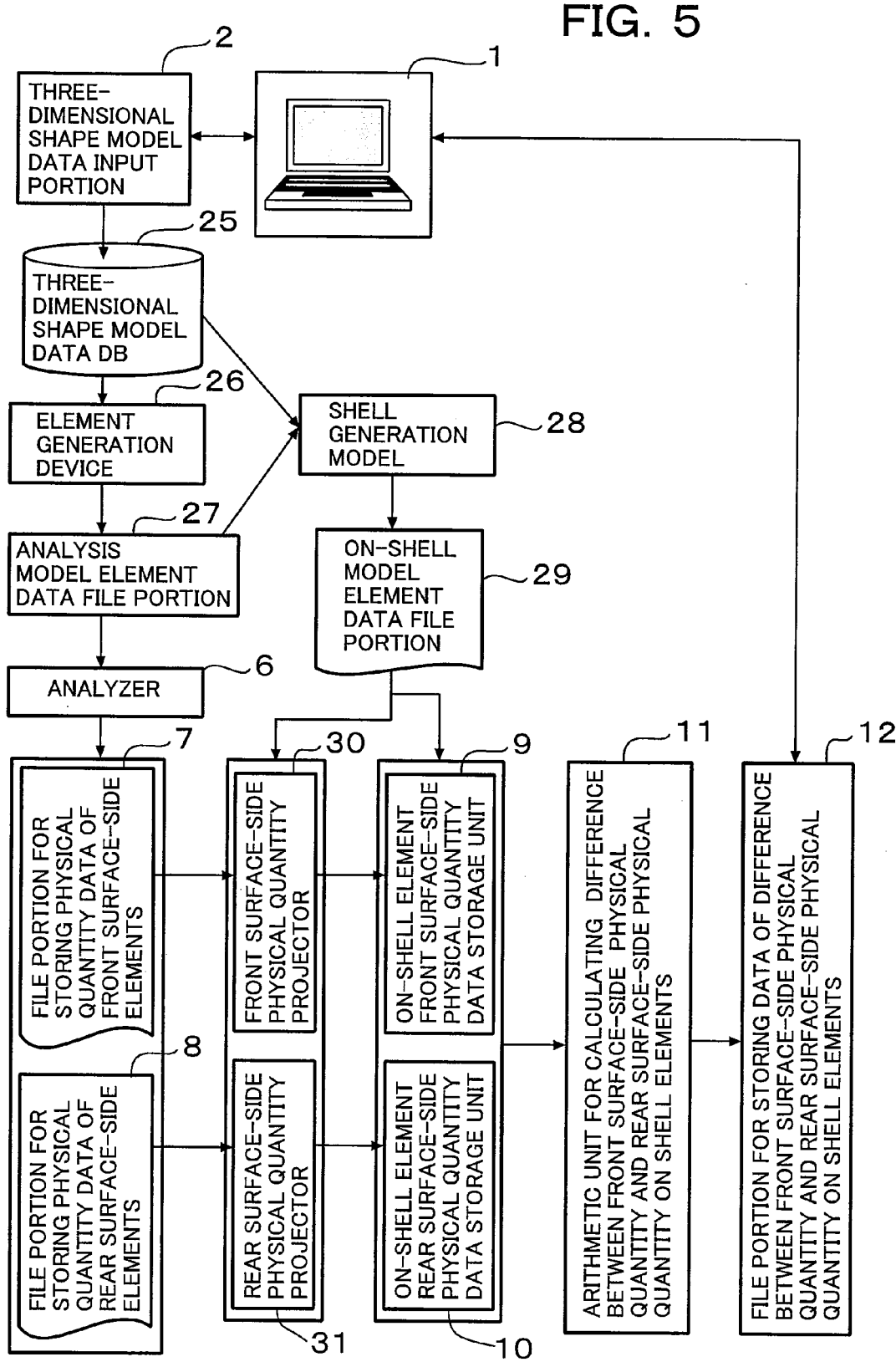
FIG. 5 is a block diagram showing the basic configuration of a numerical analysis data evaluation apparatus according to Embodiment 2 of the invention.

FIG. 5 is a block diagram showing the basic configuration of a numerical analysis data evaluation apparatus according to Embodiment 2 of the invention.

The numerical analysis data evaluation apparatus is the same as that according to Embodiment 1 in that the numerical analysis data evaluation apparatus includes an input-output device 1 having an operation portion such as a keyboard, a mouse, etc., and a display unit having a display screen, and a computer having a plurality of storage units and an arithmetic function portion, but the numerical analysis data evaluation apparatus is different from that according to Embodiment 1 in the detailed configuration of the arithmetic function portion of the computer.

The computer mentioned herein has: a three-dimensional shape model data input portion 2 which can input a three-dimensional shell model shape; a three-dimensional shape model data DB (database) 25; an element generation device 26; an analysis model element data file portion 27; a shell generation model 28; an on-shell model element data file portion 29; an analyzer 6; a file portion 7 for storing physical quantity data of front surface-side ones of analysis model elements; a file portion 8 for storing physical quantity data of rear surface-side ones of analysis model elements; a front surface-side physical quantity projector 30; a rear surface-side physical quantity projector 31; an on-shell element front surface-side physical quantity data storage unit 9; an on-shell element rear surface-side physical quantity data storage unit 10; an arithmetic unit 11 for calculating difference between front surface-side physical quantity and rear surface-side physical quantity on shell elements; and a file portion 12 for storing data of difference between front surface-side physical quantity and rear surface-side physical quantity on shell elements. In this embodiment, the same functional constituent parts as those in Embodiment 1 are referred to by the same numerals.

To describe detailed functions of the respective portions, the three-dimensional shape model data input portion 2 receives a three-dimensional shape model having a thickness on analysis model generated by a three-dimensional shape modeler and stores the three-dimensional shape model in the three-dimensional shape model data DB (database) 25.

The element generation device 26 spatially discretizes the three-dimensional shape model data stored in the three-dimensional shape model data DB 25 to divide the three-dimensional shape model data into elements such as hexahedral or tetrahedral elements and registers data of coordinates of nodes of the elements, physical quantities, etc. as analysis model element data in the analysis model element data file portion 27.

The shell generation model 28 generates a shell model having a thickness of zero on an analysis model registered in the analysis model element data file portion 27 based on the three-dimensional shape model data stored in the three-dimensional shape model data DB 25, and registers the generated shell model in the on-shell model element data file portion 29. Specifically, the shell generation model 28 spatially discretizes a shell model being a plane without any thickness to divide the shell model into a large number of polygonal shell elements such as quadrilateral elements or triangular elements, and registers data of coordinate values of nodes of the shell elements, etc. in the on-shell model element data file portion 29. Incidentally, the shell model can be generated relatively easily when, for example, a method disclosed in "Analytical shell generation model" described in JP-A-2004-287701 is applied to a technique of creating a shell model from three-dimensional shape model data.

The analyzer 6 has a function of performing numerical analysis of an analysis model by using element data on a three-dimensional shell model. In this embodiment, the analyzer 6 executes various kinds of numerical analyses based on analysis model element data registered in the analysis model element data file portion 27 and analysis conditions inputted separately. The term "numerical analyses" mentioned herein means, for example, strength analysis based on a finite element method, thermal fluid analysis based on a finite difference method, a finite volume method, or the like, electromagnetic field analysis based on an FDTD (Finite-Difference Time-Domain) method, analysis performed by spatially discretizing a designated region and solving a governing equation describing a physical phenomenon by using a numerically approximate algebraic equation, etc.

A lot of data are obtained from a result of analysis performed by the analyzer 6. Physical quantity data of front surface-side ones of the analysis model elements registered in the file portion 7 for storing physical quantity data of front surface-side ones of analysis model elements are recorded on the on-shell element front surface-side physical quantity data storage unit 9 while projected by the front surface-side physical quantity projector 30 so as to be interpolated in on-shell model element data registered in the on-shell model element data file portion 29. Similarly, physical quantity data of rear surface-side ones of the analysis model elements registered in the file portion 8 for storing physical quantity data of rear surface-side ones of analysis model elements are recorded on the on-shell element rear surface-side physical quantity data storage unit 10 while projected by the rear surface-side physical quantity projector 31 so as to be interpolated in on-shell model element data registered in the on-shell model element data file portion 29. Also in this embodiment, any one of the two surfaces concerned with the three-dimensional shape model data stored in the three-dimensional shape model data DB 25 can be designated as the front surface (i.e., the other surface can be designated as the rear surface).

The arithmetic unit 11 for calculating the difference between the front surface-side physical quantity and the rear surface-side physical quantity on the shell elements calculates data of the difference between the on-shell element front surface-side physical quantity data stored in the on-shell element front surface-side physical quantity data storage unit 9 and the on-shell element rear surface-side physical quantity data stored in the on-shell element rear surface-side physical quantity data storage unit 10, and registers the data in the file portion 12 for storing data of the difference between the front surface-side physical quantity and the rear surface-side physical quantity on shell elements.

The input-output device 1 performs a designation operation on the operation portion for displaying data of the difference between the front surface-side physical quantity and the rear surface-side physical quantity on the shell elements registered in the file portion 12 for storing data of the difference between the front surface-side physical quantity and the rear surface-side physical quantity on the shell elements or registering and keeping these data.

Also in the numerical analysis data evaluation apparatus according to Embodiment 2, the same operation and effect as in Embodiment 1 can be obtained after a three-dimensional shape model having a thickness on analysis model is inputted.

Figure 6:
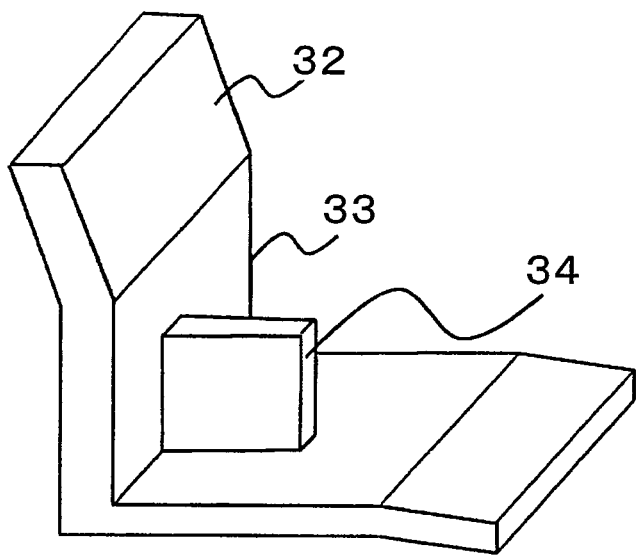
FIG. 6 is an exterior perspective view illustrating a three-dimensional shape model structure of a device component intended as a subject of a three-dimensional analysis model of the numerical analysis data evaluation apparatus shown in FIG. 5.

FIG. 6 is an exterior perspective view illustrating a three-dimensional shape model structure of a device component intended as a subject of a three-dimensional analysis model of the numerical analysis data evaluation apparatus according to Embodiment 2.

The three-dimensional shape model 32 indicates three-dimensional shape model data stored in the three-dimensional shape model data DB 25, and has a structure in which a rib member 34 is additionally provided as a flange portion integrated with an extended surface of an L-shaped member 33. Such three-dimensional shape data can be generated easily by CAD.

Figure 7:
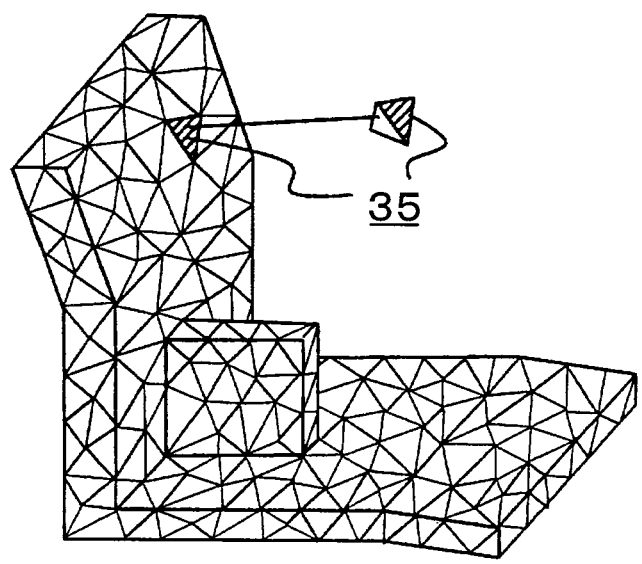
FIG. 7 is a schematic view showing analysis model element data generated by an element generation device provided in the numerical analysis data evaluation apparatus shown in FIG. 5 in such a manner that the element generation device spatially discretizes three-dimensional shape model data of the device component shown in FIG. 6.

FIG. 7 is a schematic view showing analysis model element data generated by spatially discretizing data of the three-dimensional shape model 32 by the element generation device 26.

The analysis model element data are data registered in the analysis model element data file portion 27. The analysis model element data are discretized as a set of tetrahedral elements 35. Incidentally, with respect to the shape of each element, the elements may be dealt with as other polyhedral elements such as hexahedral elements.

Figure 8:
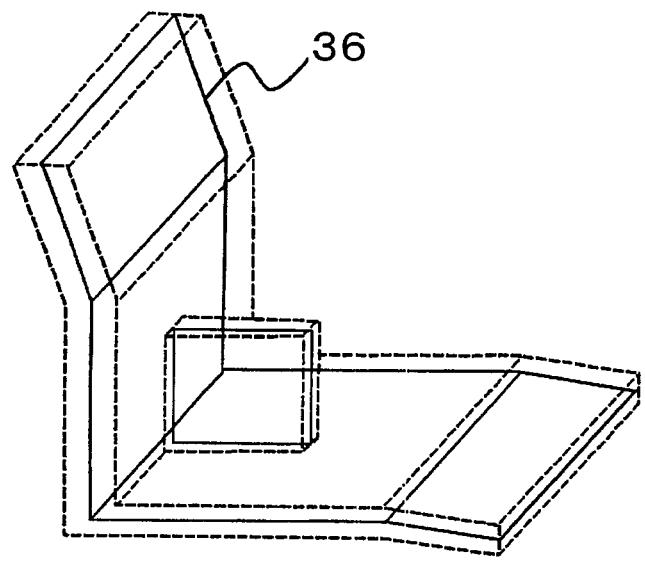
FIG. 8 illustrates a shell model generated from three-dimensional shape model data or analysis model element data of the device component explained in FIG. 7 and displayed on a display screen of a display unit included in an input-output device provided in the numerical analysis data evaluation apparatus shown in FIG. 5.

FIG. 8 illustrates a shell model 36 (displayed on the display screen of the display unit) generated by the shell generation model 28 from data of the three-dimensional shape model 32 or analysis model element data thereof.

That is, the shell generation model 28 generates a shell model 36 having a thickness of zero from data of the three-dimensional shape model 32 stored in the three-dimensional shape model data DB 25 or analysis model element data obtained by specially discretizing the data of the three-dimensional shape model 32 by the element generation device 26 and registered in the analysis model element data file portion 27, and further spatially discretizes the shell model 36.

Figure 9:
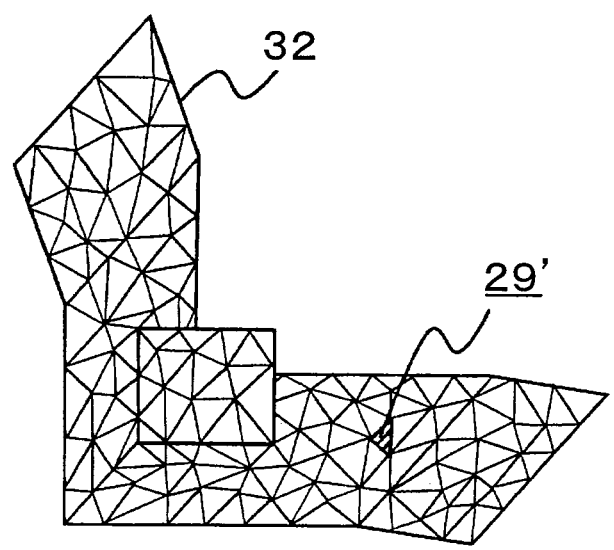
FIG. 9 shows a state where element data on the shell model explained in FIG. 8 are displayed on the display screen of the display unit.

FIG. 9 shows the case where element data on the shell model 36 are displayed on the display screen of the display unit. FIG. 9 shows a state where a shell element 29' is generated as element data on the shell model 36 of the three-dimensional shape model 32 as a result of spatial discretization of the shell model 36 by the shell generation model 28.

The shell model 36 of the three-dimensional shape model 32 can be generated easily even when a convex part such as the rib member 34 is present as shown in FIG. 6 or a cavity or hole etc. is present in a surface of a member. The shell model 36 can be generated easily even when a member is so tapered that the thickness of the member varies according to the place. The shell model 36 may be spatially discretized so that a shell element 29' can be generated relatively easily as element data on the shell model 36 as shown in FIG. 9.

Then, numerical analysis is executed by the analyzer 6 with use of tetrahedral elements 35 shown in FIG. 7 and other input conditions not shown (physical property values, boundary conditions, initial values, etc.) as input values. Examples of numerical analysis include various kinds of analyses such as strength analysis, thermal fluid analysis, electromagnetic field analysis, vibration analysis, etc. Each of these numerical analyses is executed based on an algebraic equation obtained by numerically discretizing a governing equation of a physical phenomenon.

Figure 10:
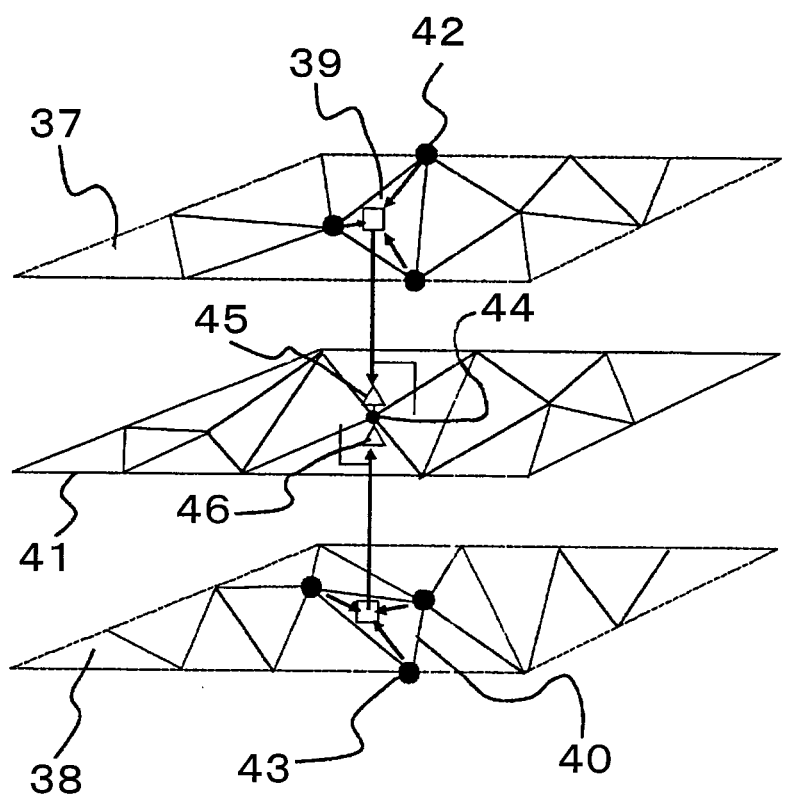
FIG. 10 is a schematic view showing the relation among the positions of nodes of front surface elements on a front surface of the three-dimensional shape model data of the device component explained in FIG. 7, the positions of nodes of rear surface elements on a rear surface thereof and the positions of nodes of shell elements.

FIG. 10 is a schematic view showing the relation among the positions of nodes of front surface elements on a front surface of the three-dimensional shape model 32 being three-dimensional shape model data, the positions of nodes of rear surface elements on a rear surface of the three-dimensional shape model 32 and the positions of nodes on shell elements.

In a tetrahedral element 35 shown in FIG. 7, a physical quantity used for numerical analysis is defined on nodes 42 of a front surface-side element or nodes 43 of a rear surface-side element as shown in FIG. 10 or by representative points such as element surface center points or element center points not shown. Similarly in the shell elements generated from the shell model 41, a physical quantity used in numerical analysis is defined on a node 44 of a shell element or by representative points such as element surface center points. In any case, the physical quantity can be recalculated by interpolation using values in elements or adjacent elements. Description will be made below while the case where a physical quantity is defined on each node is taken as a representative example.

Referring to the schematic view of FIG. 10, the position of a node 42 of a front surface-side element concerned with front surface-side elements 39 on the front surface 37 side of three-dimensional shape model data is not generally coincident with the position of a node 43 of a rear surface-side element concerned with rear surface-side elements 40 on the rear surface 38 side of the three-dimensional shape model data. It is therefore impossible to obtain the difference between physical quantity data of the front surface-side element and physical quantity data of the rear surface-side element simply.

The position of a node 44 of a shell element generated from the shell model 41 is not generally coincident with the position of the node 42 of the front surface-side element and the position of the node 43 of the rear surface-side element. Therefore, the front surface-side physical quantity protector 30 and the rear surface-side physical quantity projector 31 specify elements containing intersections between lines extended vertically from the node 44 of the shell element toward the front surface side and the rear surface side of the shell model 41 respectively and the front surface 37 of three-dimensional shape model data and the rear surface 38 of the three-dimensional shape model data, and set the elements as a front surface-side element 39 and a rear surface-side element 40 as sources of projection of physical quantities respectively.

The physical quantities stored in the respective nodes 42 and 43 are interpolated based on the distance between the intersections and the nodes 42 and 43 of the front surface-side and rear surface-side elements constituting the front surface-side and rear surface-side elements 39 and 40 as sources of projection. The physical quantities are stored as on-shell element front surface-side physical quantity data 45 and on-shell element rear surface-side physical quantity data 46 in the on-shell element front surface-side physical quantity data storage unit 9 and the on-shell element rear surface-side physical quantity data storage unit 10.

Incidentally, the front surface and the rear surface in this embodiment mean a near surface and a far surface when the model is viewed from a view point. Although the front surface and the rear surface may be reversed when the view point is changed, the front surface and the rear surface are determined based on the distance from a model viewing point for the sake of convenience because there is no substantial problem.

According to the aforementioned configuration, data of physical quantity difference between the front surface and the rear surface can be acquired easily in a wide range on shell geometry data by the arithmetic unit 11 for calculating the difference between the front surface-side physical quantity and the rear surface-side physical quantity on shell elements. After the data are registered in the file portion 12 for storing data of the difference between the front surface-side physical quantity and the rear surface-side physical quantity on shell elements, the data can be put in display or recording management due to the input-output device 1.

According to the numerical analysis data evaluation apparatus according to Embodiment 2, the positions of corresponding elements on the front and rear surfaces can be specified easily through shell elements being a neutral surface even when numerical analysis is performed by use of three-dimensional shape model data having a complicated structure stored in the three-dimensional shape model data DB 25. Accordingly, the distribution of physical quantity difference values between the front surface and the rear surface of the three-dimensional shape model can be acquired easily. As a result, places where the difference between the front surface and the rear surface becomes large can be specified particularly easily, so that the risk of slipping over evaluation of analysis results causing a problem on design of various kinds of products can be reduced.

Embodiment 3

Figure 11:
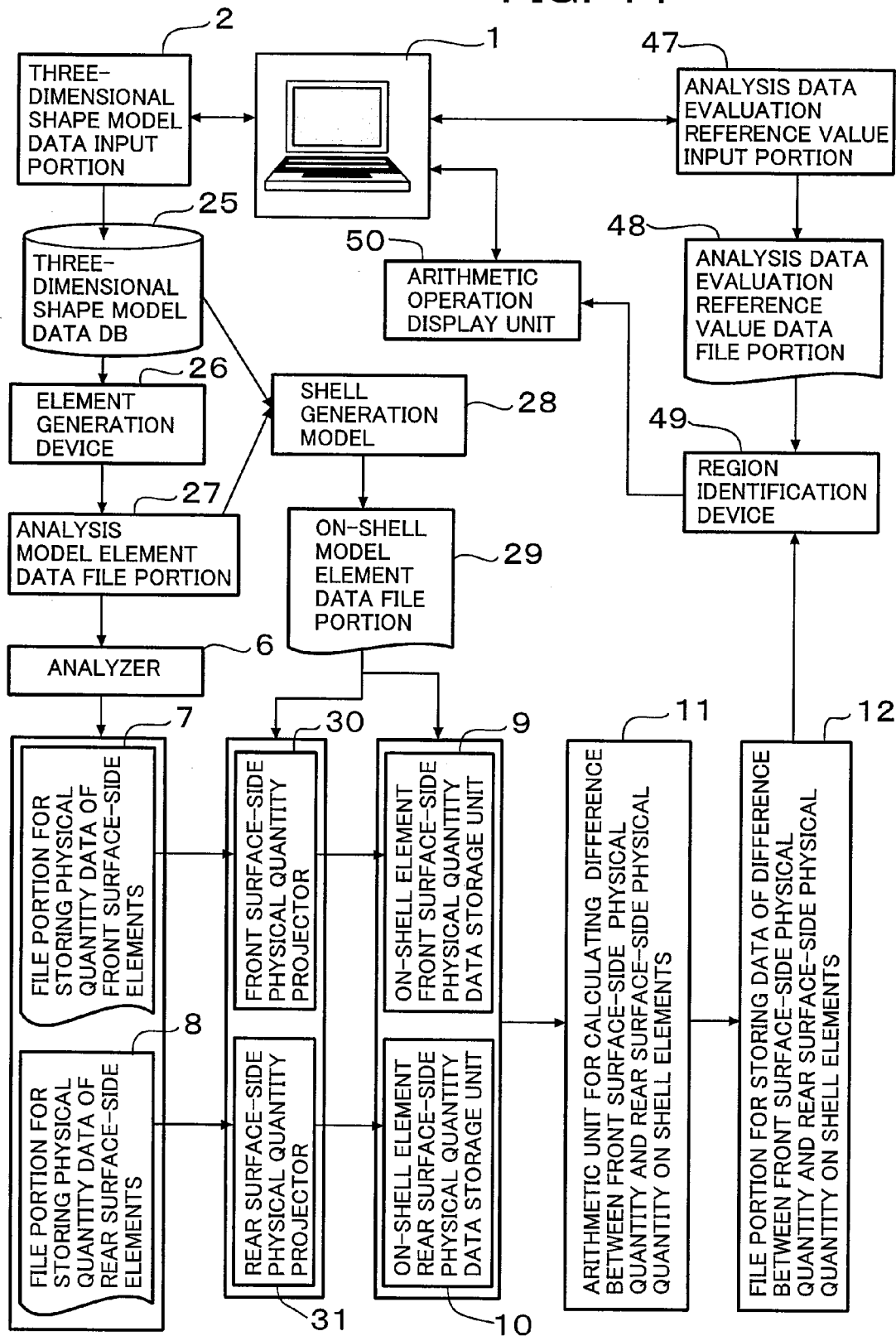
FIG. 11 is a block diagram showing the basic configuration of a numerical analysis data evaluation apparatus according to Embodiment 3 of the invention.

FIG. 11 is a block diagram showing the basic configuration of a numerical analysis data evaluation apparatus according to Embodiment 3 of the invention.

The numerical analysis data evaluation apparatus is the same as that according to Embodiment 1 or 2 in that the numerical analysis data evaluation apparatus includes an input-output device 1 having an operation portion such as a keyboard, a mouse, etc., and a display unit having a display screen, and a computer having a plurality of storage units and an arithmetic function portion, but the numerical analysis data evaluation apparatus is different from that according to Embodiment 1 or 2 in the detailed configuration of the arithmetic function portion of the computer.

That is, the computer in this embodiment has an analysis data evaluation reference value input portion 47, an analysis data evaluation reference value data file portion 48, a region identification device 49, and an arithmetic operation display unit 50 in addition to all constituent portions of Embodiment 2.

To describe the detailed functions of the respective added portions, the analysis data evaluation reference value input portion 47 receives an analysis data evaluation reference value and registers data of the analysis data evaluation reference value in the analysis data evaluation reference value data file portion 48.

The region identification device 49 compares data of the difference between the front surface-side physical quantity and the rear surface-side physical quantity on shell elements from the file portion 12 for storing data of the difference between the front surface-side physical quantity and the rear surface-side physical quantity on shell elements with the analysis data evaluation reference value data registered in the analysis data evaluation reference value data file portion 48, identifies regions in each of which data of the difference is larger than the analysis data evaluation reference value data, and displays the regions on the display screen of the display unit of the input-output device 1 through the arithmetic operation display unit 50 or puts the regions into recording operation on the operation portion. In the region identification mentioned herein, the position and size of each region are identified based on elements containing nodes larger than the analysis data evaluation reference value data.

The arithmetic operation display unit 50 performs an arithmetic operation for placing the regions not smaller than the reference value in descending order of absolute value of the difference between the front surface-side physical quantity and the rear surface-side physical quantity on the three-dimensional shape model (analysis model) 32 or integrated area value of the difference between the front surface-side physical quantity and the rear surface-side physical quantity, and displays the regions on the display screen of the display unit. As a result, places having large influence can be specified easily.

According to the numerical analysis data evaluation apparatus according to Embodiment 3, in addition to the merits of the apparatus according to Embodiment 2, places where the difference between the front and the rear becomes large can be specified very easily because regions are displayed in descending order of physical quantity difference or integrated area value on three-dimensional shape model data. Accordingly, the risk of slipping over evaluation of analysis results causing a problem on design of various kinds of products can be reduced conspicuously.

Embodiment 4

Figure 12:
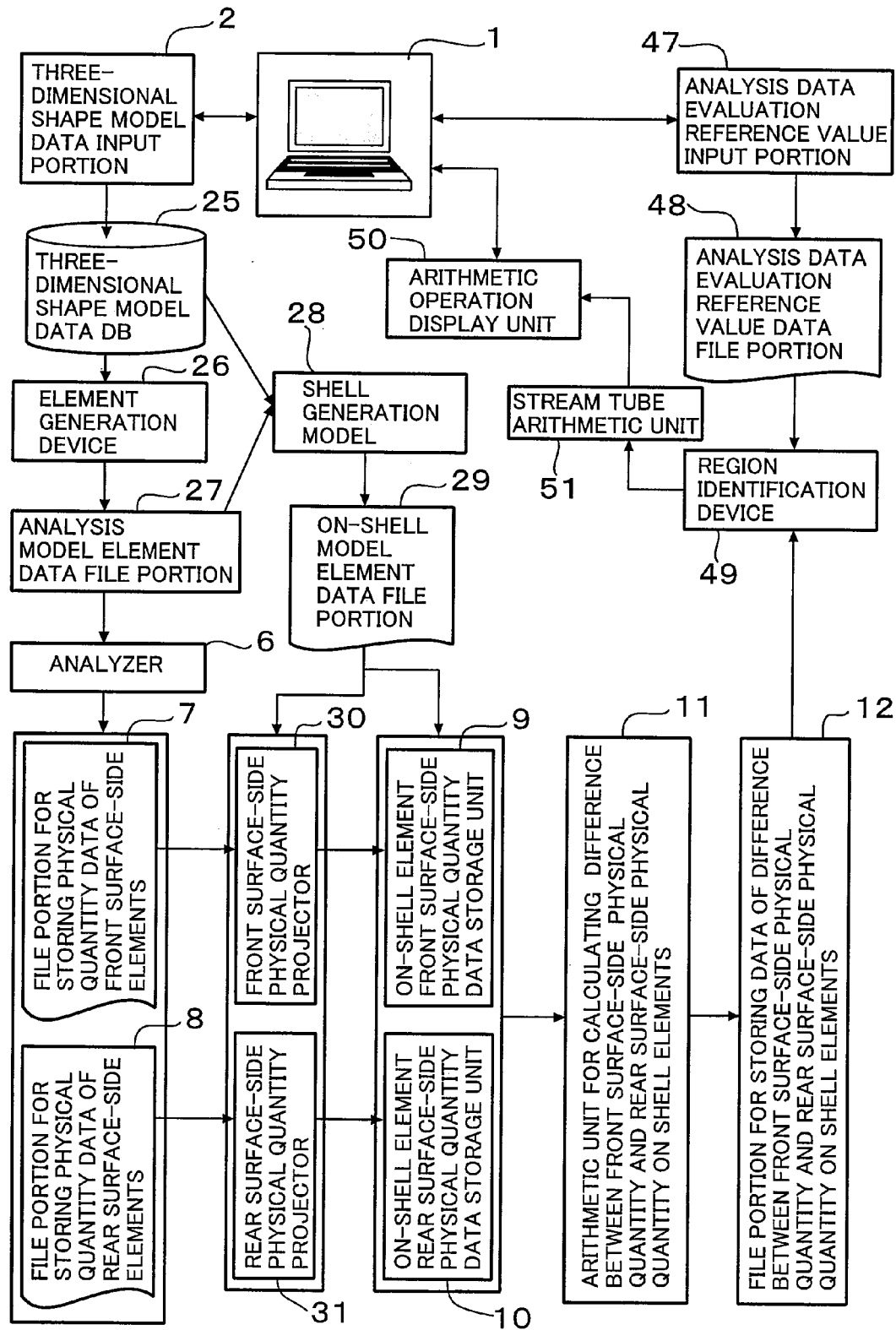
FIG. 12 is a block diagram showing the basic configuration of a numerical analysis data evaluation apparatus according to Embodiment 4 of the invention.

FIG. 12 is a block diagram showing the basic configuration of a numerical analysis data evaluation apparatus according to Embodiment 4 of the invention.

The numerical analysis data evaluation apparatus is the same as that according to each of the aforementioned embodiments in that the numerical analysis data evaluation apparatus includes an input-output device 1 having an operation portion such as a keyboard, a mouse, etc., and a display unit having a display screen, and a computer having a plurality of storage units and an arithmetic function portion, but the numerical analysis data evaluation apparatus is different from that according to each of the aforementioned embodiments in the detailed configuration of the arithmetic function portion of the computer.

That is, the computer in this embodiment has, as an arithmetic unit, a stream tube arithmetic unit 51 which calculates the position and shape of a stream tube formed through an opening when the opening is provided in a region identified by the region identification device 49, and performs an arithmetic operation for calculating a volume ratio of a heat generating body to the stream tube or a distance between the heat generating body and the stream tube, in addition to all constituent portions of Embodiment 3.

The numerical analysis data evaluation apparatus according to Embodiment 4 is applied to the case where thermal fluid analysis is performed as a target of the analyzer 6. The numerical analysis data evaluation apparatus can be regarded as a thermal fluid pressure data evaluation apparatus on the assumption that the physical quantity is pressure.

Figure 13:
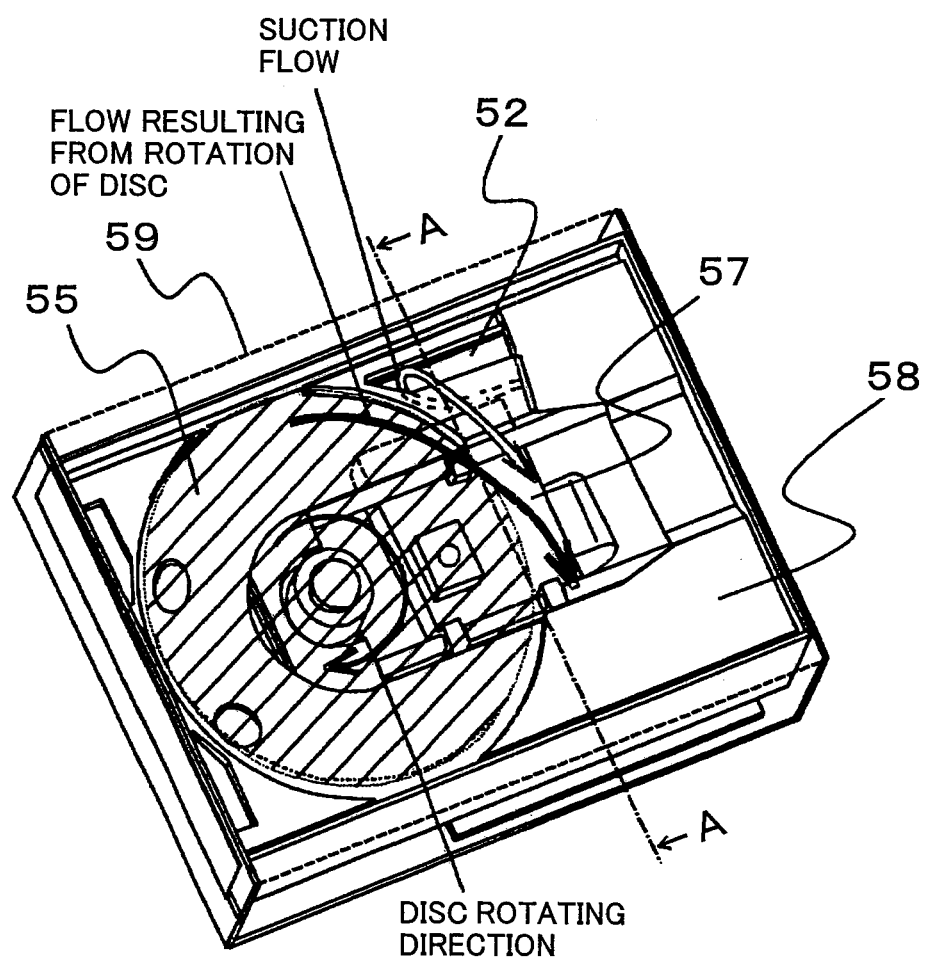
FIG. 13 is a perspective view illustrating the internal structure of an optical disc device intended as a subject of a three-dimensional analysis model of the numerical analysis data evaluation apparatus shown in FIG. 12.
Figure 14:
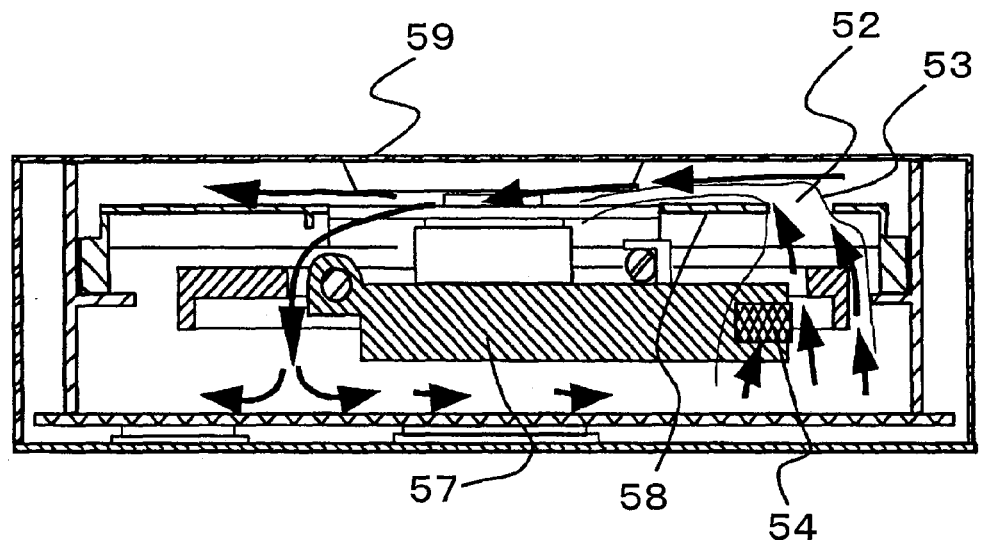
FIG. 14 is a side sectional view of the optical disc device shown in FIG. 13, taken along the line A-A.

FIG. 13 is a perspective view illustrating the internal structure of an optical disc device used as a subject of a three-dimensional analysis model. FIG. 14 is a side sectional view of the optical disc device taken along the line A-A.

Referring to the structural view of the optical disc device, the optical disc device has a structure in which a stream tube 53 is formed between a tray 58 disposed in an upper portion of an optical pickup 57 having heat generating parts 54 and an upper cover 59 via an opening 52 provided in a predetermined place of the tray 58 to circulate and cool heat generated from the heat generating parts 54 when the disc 55 is put on the tray 58 and driven by a motor.

Specifically, the disc 55 is rotated at a high speed of about 9000 revs per minute in the inside of a housing including the upper cover 59 by the motor. On this occasion, a laser light is emitted from the heat generating parts (laser diode) 54 in the optical pickup 57 and guided to the disc 55 via a not-shown optical system disposed in the optical pickup 57, so that data are recorded/reproduced. The disc 55 is put on the tray 58 and mounted/demounted to/from the optical disc device by a not-shown drive mechanism. The tray 58 is retracted into the optical disc device when the disc 55 is rotated.

In the optical disc device, when the disc 55 is rotated at a high speed, a region of negative pressure of about −50 Pa is formed on the upper side of the disc 55. This is because the flow rate of air flowing into the inner circumferential side of the disc 55 is suppressed by the presence of the upper cover 59 and further because of centrifugal force due to rotation of the disc 55.

For example, according to "optical disc device" described in JP-A-2007-102884 as a well-known technique, it is known that the negative pressure region on the upper side of the disc 55 is extended locally to the outside of the disc 55 and a secondary flow from the lower side to the upper side of the tray 58 is induced by a pressure difference between the front and the rear of the tray when the opening 52 is provided, so that an effect of accelerating cooling of the heat generating parts (laser diode) 54 in the optical pickup 57 can be obtained.

In the numerical analysis data evaluation apparatus according to Embodiment 4, the region identification device 49 identifies a region where the pressure difference between a front surface and a rear surface of the tray 58 or the area integral value of the pressure difference is not smaller than a reference value, and the stream tube arithmetic unit 51 calculates the stream tube 53 formed via the opening 52.

The arithmetic operation display unit 50 performs an arithmetic operation for placing position regions of the opening 52 in descending order of volume ratio of a heat generating body generated by heating of the heat generating parts 54 to the stream tube 53 or in ascending order of distance between the heat generating body and the stream tube 53, and displays the regions on the display screen of the display unit.

Figure 15:
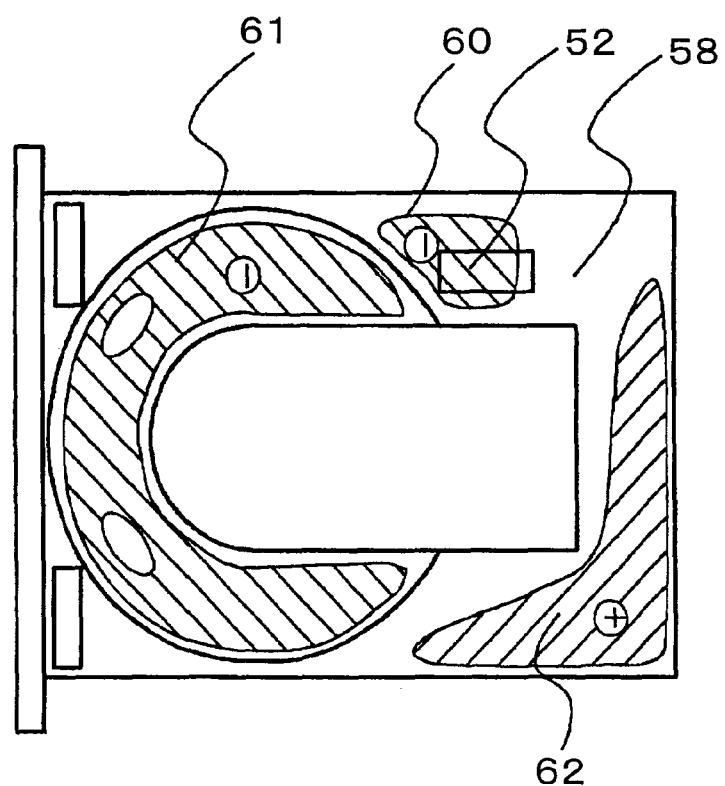
FIG. 15 is a schematic view showing a result of evaluation of pressure difference between the front surface side and the rear surface side of a tray in the optical disc device shown in FIG. 13.

FIG. 15 is a schematic view showing a result of evaluation of pressure difference between the front surface side and the rear surface side of the tray in the optical disc device. FIG. 15 shows a state where pressure difference from the rear surface toward the front surface is generated in regions 60 and 61 and pressure difference from the front surface toward the rear surface is generated in a region 62 as a result of thermal fluid analysis of the inside of the optical disc device when the paper surface of FIG. 15 is regarded as the front surface.

The pressure difference explained in FIG. 15 generates a flow (circulation) of air in directions of arrows shown in FIG. 14. The stream tube 53 passing through the opening 52 is represented by a streamlined envelope passing through a certain closed curve. Referring to FIG. 14, it is apparent that cooling is accelerated because the heat generating parts (laser diode) 54 is just included in the stream tube 53. Though not shown, it is separately confirmed that stream tubes passing through the regions 61 and 62 hardly contribute to cooling of the heat generating parts (laser diode) 54 because the stream tubes do not pass through the heat generating parts (laser diode) 54 and the distance between each of the stream tubes and the heat generating parts (laser diode) 54 is long.

The structure in which the opening 52 is provided in the tray 58 has been found out based on a result of eye confirmation in arrangement of picture compositions that the pressure difference between the front surface and the rear surface of the tray 58 is displayed on the display screen of the display unit, and based on a result of numerical discussion in evaluation in a state where about tens of pressure measurement sampling points are taken in the position of the opening 52. Analysis data have been examined carefully and slowly with long processing time to thereby find out a phenomenon likely to be overlooked. The phenomenon is used here.

Analysis data evaluation according to this embodiment makes it possible to find out such a phenomenon easily. This is very effective in achieving improvement in product performance of products on the site of cooling design.

Incidentally, evaluation using the stream tube 53 requires a certain degree of calculation load for creating the stream tube 53. When simple evaluation is to be performed rapidly, the distance between a discussed place of the opening 52 and the heat generating parts (laser diode) 54 may be used as an index of evaluation.

Figure 16:
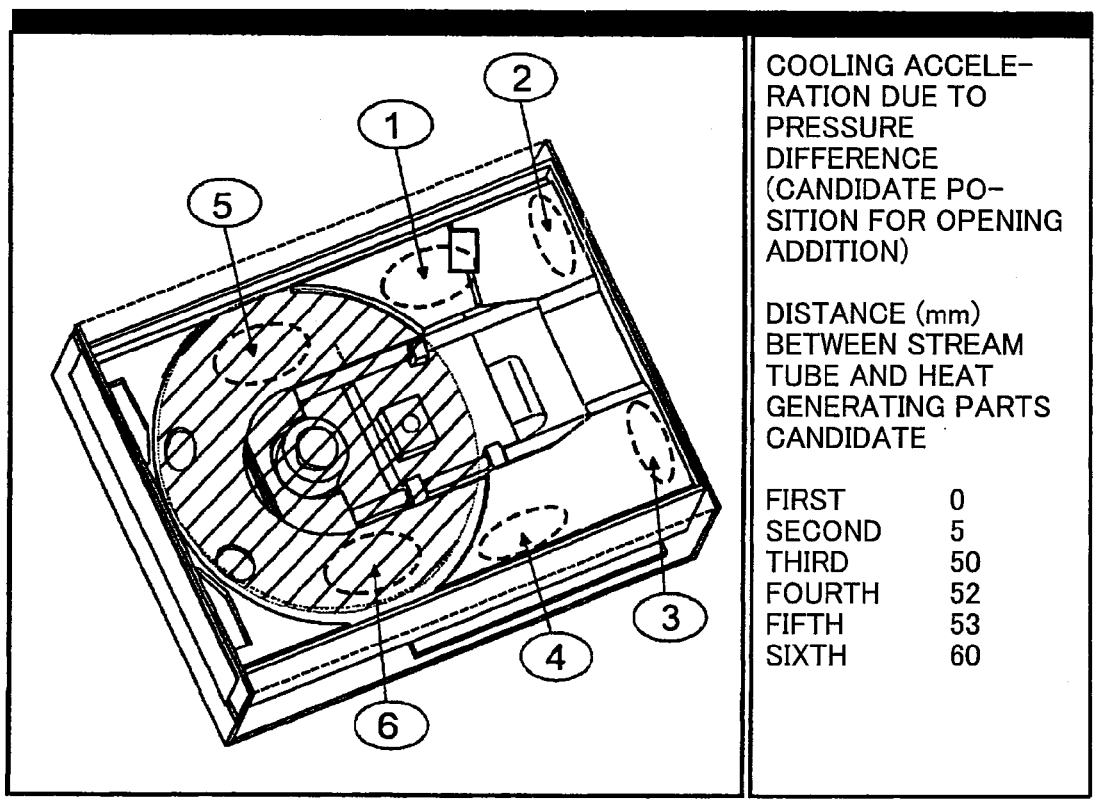
FIG. 16 is a view illustrating an arithmetic operation for placing performance results in order based on a performance index with respect to the internal structure of the optical disc device shown in FIG. 13 and displayed on a display screen of a display unit included in an input-output device provided in the numerical analysis data evaluation apparatus shown in FIG. 12.

FIG. 16 illustrates an arithmetic operation for placing performance results in order based on a performance index with respect to the internal structure of the optical disc device displayed on the display screen of the display unit.

FIG. 16 shows a state where performance results based on a performance index are displayed in order on the display screen of the display unit of the input-output device 1 while regions corresponding to the performance results are displayed. Accordingly, the risk of slipping over evaluation of analysis results of fluidal feature structures contributing to improvement in performance on product design can be reduced greatly, so that the invention can contribute to shortening of the term of product design.

What is claimed is:

1. A thermal fluid pressure data evaluation apparatus comprising:
   a CPU, the CPU comprises:
   an analyzer which performs numerical analysis of an analysis model for numerical simulation of a physical phenomenon by using a three-dimensional shell model with a thickness of zero on the analysis model;
   a first storage unit which stores data of on-shell model elements obtained by spatially discretizing the three-dimensional shell model and front surface-side physical quantities of on-shell elements;
   a second storage unit which stores rear surface-side physical quantities of the on-shell elements;
   an arithmetic unit which calculates differences between the front surface-side physical quantities and the rear surface-side physical quantities of the on-shell elements;
   a reference value input unit which inputs a reference value for recognizing a feature region from analysis data as an output of the analyzer;
   a region identification device which identifies a region in which the difference between the front surface-side physical quantity and the rear surface-side physical quantity of the analysis model obtained by a result of the numerical analysis is larger than the reference value, by using the element data generated on the shell model based on the three-dimensional shape model; and
   an arithmetic operation display unit which performs an arithmetic operation for placing regions not smaller than the reference value in descending order of absolute value of the difference between the front surface-side physical quantity and the rear surface-side physical quantity in the analysis model or area integral value of the difference between the front surface-side physical quantity and the rear surface-side physical quantity, and displays the regions in the order,
   wherein, pressure is the physical quantity, the arithmetic unit calculates pressure difference between front surface-side pressure and rear surface-side pressure in the analysis model,
   the region identification device identifies regions in which the pressure difference or the area integral value of the pressure difference is not smaller than the reference value inputted by the reference value input unit,
   the arithmetic unit further calculates the distance between each of the regions not smaller than the reference value and a heat generating body,
   the arithmetic operation display unit performs an arithmetic operation for placing regions in ascending order of the distance and displays the regions in the order,
   the arithmetic unit calculates the position and shape of a stream tube formed through an opening when the opening is provided in each of the regions identified by the region identification device, and the arithmetic unit further calculates a volume into of the heat generating body to the stream tube or a distance between the heat generating body and the stream tube, and
   the arithmetic operation display unit performs an arithmetic operation for placing position regions of the opening in descending order of the volume ratio or in ascending order of the distance, and displays the position regions in the order.

2. A thermal fluid pressure data evaluation apparatus, comprising:
   a CPU, the CPU comprises:
   an element generation device which generates element data on a three-dimensional shell model by spatially discretizing a thickness-including three-dimensional shape model generated by a three-dimensional shape modeler;
   an analyzer which performs numerical analysis of an analysis model for numerical simulation of a physical phenomenon by using the element data;
   a shell generation model which converts the three-dimensional shape model into the three-dimensional shell model so that a thickness on the analysis model becomes zero;
   a front surface-side physical quantity projector which interpolates physical quantities of front surface-side elements of the three-dimensional shape model obtained as a result of the numerical analysis in element data on a shell model obtained by spatially discretizing the three-dimensional shell model and projects the physical quarries on front surface-side physical quantities of on-shell elements;
   a rear surface-side physical quantity projector which interpolates physical quantities of rear surface-side elements of the three-dimensional shape model obtained as a result of the numerical analysis in element data on a shell model obtained by spatially discretizing the three-dimensional shell model and protects the physical quantities on rear surface-side physical quantities of on-shell elements;
   a first storage unit which stores the front surface-side physical quantities of the on-shell elements after the interpolation and projection;

a second storage unit which stores the rear surface-side physical quantities of the on-shell elements after the interpolation and projection;

an arithmetic unit which calculates differences between the front surface-side physical quantities and the rear surface-side physical quantities of the on-shell elements after the interpolation and protection;

a reference value input unit which inputs a reference value for recognizing a feature region from analysis data as an output of the analyzer;

a region identification device which identifies a region in which the difference between the front surface-side physical quantity and the rear surface-side physical quantity in the analysis model obtained as a result of the numerical analysis is larger than the reference value, by using the element data generated on the shell model based on the three-dimensional shape model; and an arithmetic operation display unit which performs an arithmetic operation for placing regions not smaller than the reference value in descending order of absolute value of the difference between the front surface-side physical quantity and the rear surface-side physical quantity in the analysis model or in ascending order of area integral value of the difference between the front surface-side physical quantity and the rear surface-side physical quantity, and displays the regions in the order, wherein, pressure is the physical quantity, the arithmetic unit calculates pressure difference between front surface-side pressure and rear surface-side pressure in the analysis model, the region identification device identifies regions in which the pressure difference or the area integral value of the pressure difference is not smaller than the reference value inputted by the reference value input unit, the arithmetic unit further calculates the distance between each region not smaller than the reference value and a heat generating body, and the arithmetic operation display unit performs an arithmetic operation for placing regions in ascending order of the distance and displays the regions in the order, the arithmetic unit calculates the position and shape of a stream tube formed through an opening when the opening is provided in each of the regions identified by the region identification device, and the arithmetic unit further calculates a volume ratio of the heat generating body to the stream tube or a distance between the heat generating body and the stream tube, and the arithmetic operation display unit performs an arithmetic operation for placing position regions of the opening in descending order of the volume ratio or in ascending order of the distance, and displays the position regions in the order.

* * * * *